(12) United States Patent
Zheng et al.

(10) Patent No.: US 12,067,217 B2
(45) Date of Patent: Aug. 20, 2024

(54) VIDEO PROCESSING METHOD, APPARATUS, DEVICE AND STORAGE MEDIUM

(71) Applicant: Beijing Zitiao Network Technology Co., Ltd., Beijing (CN)

(72) Inventors: Lingling Zheng, Beijing (CN); Jun Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/516,798

(22) Filed: Nov. 21, 2023

(65) Prior Publication Data
US 2024/0126410 A1    Apr. 18, 2024

Related U.S. Application Data

(63) Continuation of application No. PCT/CN2023/120052, filed on Sep. 20, 2023.

(30) Foreign Application Priority Data

Oct. 14, 2022   (CN) .......................... 202211263267.0

(51) Int. Cl.
G06F 3/0482   (2013.01)
G06F 3/0484   (2022.01)

(52) U.S. Cl.
CPC .......... G06F 3/0482 (2013.01); G06F 3/0484 (2013.01); G06F 2203/04804 (2013.01)

(58) Field of Classification Search
CPC ................. G06F 3/0482; G06F 3/0484; G06F 2203/04804
See application file for complete search history.

(56) References Cited

U.S. PATENT DOCUMENTS

2005/0149880 A1*   7/2005   Postrel ............... G06Q 30/0277
                                                                705/14.54
2011/0197129 A1     8/2011   Hsu et al.
(Continued)

FOREIGN PATENT DOCUMENTS

CN   104105002 A   10/2014
CN   113038198 A   6/2021
(Continued)

OTHER PUBLICATIONS

CRSKY.com, "How to bookmark your favorite videos in Bilibili" https://m.crsky.com/mip/zixun/394648.html, (May 17, 2022), pp. 1-8 (contains English Translation).

*Primary Examiner* — Cao H Nguyen
(74) *Attorney, Agent, or Firm* — BakerHostetler (57) ABSTRACT

The present disclosure provides a video processing method, an apparatus, a device, and a storage medium, and the method includes: first, displaying a favorites menu at a display position corresponding to a favorites control in response to a preset triggering operation for the favorites control on a video playing page, in which the favorites menu comprises at least one favorites folder created by a current user; then, adding a first video being displayed on the video playing page to a target favorites folder in response to a selection operation for the target favorites folder among the at least one favorites folder.

19 Claims, 6 Drawing Sheets

Displaying a favorites menu at a display position corresponding to a favorites control in response to a preset triggering operation for the favorites control on a video playing page;  — S101

Adding a first video being displayed on the video playing page to a target favorites folder in response to a selection operation for the target favorites folder among the at least one favorites folder.  — S102

(56) References Cited

U.S. PATENT DOCUMENTS

2012/0284623 A1* 11/2012 Soderstrom ........ H04N 21/4788
715/719
2023/0006961 A1* 1/2023 Li .......................... H04L 51/52

FOREIGN PATENT DOCUMENTS

| CN | 115623274 A | 1/2023 |
| CN | 115687662 A | 2/2023 |

* cited by examiner

VIDEO PROCESSING METHOD, APPARATUS, DEVICE AND STORAGE MEDIUM

CROSS-REFERENCE TO RELATED APPLICATION

This application is a continuation of International Application No. PCT/CN2023/120052 filed on Sep. 20, 2023, which claims the priority to and benefits of Chinese Patent Application No. 202211263267.0, filed on Oct. 14, 2022. All the aforementioned patent applications are hereby incorporated by reference in their entireties.

TECHNICAL FIELD

Embodiments of the present disclosure relates to a video processing method, an apparatus, a device, and a storage medium.

BACKGROUND

With the continuous development of video processing technology, people have more and more diversified requirements on video-related functions, and meanwhile, operations for the video-related functions are more and more complicated. Therefore, how to simplify operation steps for the video-related functions and facilitate the use of users to improve the user experience is a technical problem that needs to be solved urgently.

SUMMARY

In order to solve the technical problems described above, the present disclosure provides a video processing method, an apparatus, a device, and a storage medium, which can simplify operation steps for video interaction functions, and facilitate the use of users, thereby improving the user experience.

In a first aspect, the present disclosure provides a video processing method, and the method comprises:
  displaying a favorites menu at a display position corresponding to a favorites control in response to a preset triggering operation for the favorites control on a video playing page, in which the favorites menu comprises at least one favorites folder created by a current user;
  and adding a first video being displayed on the video playing page to a target favorites folder in response to a selection operation for the target favorites folder among the at least one favorites folder.

In an optional embodiment, displaying a favorites menu at a display position corresponding to a favorites control in response to a preset triggering operation for the favorites control on a video playing page, comprises:
  determining whether the current user has created a favorites folder in response to the preset triggering operation for the favorites control on the video playing page;
  and displaying the favorites menu at the display position corresponding to the favorites control if the current user is determined to have created the favorites folder.

In an optional embodiment, the method further comprising:
  displaying a favorites creation panel on the video playing page if the current user is determined not to have created the favorites folder;
  and creating a first favorites folder based on the favorites creation panel, and adding the first video being displayed on the video playing page to the first favorites folder.

In an optional embodiment, displaying a favorites menu at a display position corresponding to a favorites control in response to a preset triggering operation for the favorites control on a video playing page, comprises:
  displaying the favorites menu at the display position corresponding to the favorites control in response to a long press operation for the favorites control on the video playing page;
  correspondingly, adding a first video being displayed on the video playing page to a target favorites folder in response to a selection operation for the target favorites folder among the at least one favorites folder, comprises:
  adding the first video being displayed on the video playing page to the target favorites folder in response to an operation of sliding to the target favorites folder among the at least one favorites folder based on the long press operation.

In an optional embodiment, displaying a favorites menu at a display position corresponding to a favorites control in response to a preset triggering operation for the favorites control on a video playing page, comprises:
  displaying the favorites menu in a form of a bubble at the display position corresponding to the favorites control, in response to the preset triggering operation for the favorites control on the video playing page.

In an optional embodiment, the method further comprising:
  creating a second favorites folder in response to a triggering operation for the favorites creation control, and adding the first video being displayed on the video playing page to the second favorites folder.

In a second aspect, the present disclosure provides a video processing apparatus, and the apparatus comprises:
  a first display module, configured to display a favorites menu at a display position corresponding to a favorites control in response to a preset triggering operation for the favorites control on a video playing page, in which the favorites menu comprises at least one favorites folder created by a current user;
  and a first adding module, configured to add a first video being displayed on the video playing page to a target favorites folder in response to a selection operation for the target favorites folder among the at least one favorites folder.

In a third aspect, the present disclosure provides a computer-readable storage medium, storing instructions, in which the instructions, when running on a terminal device, cause the terminal device to implement any one of the methods mentioned above.

In a fourth aspect, the present disclosure provides a device, comprising a memory, a processor, and a computer program stored on the memory and capable of running on the processor, and the processor, when executing the computer program, implements any one of the methods mentioned above.

In a fifth aspect, the present disclosure provides a computer program product, comprising a computer program/instruction, and the computer program/instruction, when executed by a processor, implements any one of the methods mentioned above.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

DETAILED DESCRIPTION

In order to understand the above objects, features and advantages of the present disclosure more clearly, the solutions of the present disclosure will be further described below. It should be noted that, in case of no conflict, the features in one embodiment or in different embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

With the continuous development of video processing technology, people have more and more diversified requirements on video-related functions, and meanwhile, operations for the video-related functions are more and more complicated. Therefore, how to simplify operation steps for the video-related functions and facilitate the use of users to improve the user experience is a technical problem that needs to be solved urgently.

To this end, the embodiments of the present disclosure provide a video processing method, and the method includes: first, displaying a favorites menu at a display position corresponding to a favorites control in response to a preset triggering operation for the favorites control on a video playing page, in which the favorites menu includes at least one favorites folder created by a current user; then, adding a first video being displayed on the video playing page to a target favorites folder in response to a selection operation for the target favorites folder among the at least one favorites folder. The embodiments of the present disclosure can more quickly achieve the function of adding the first video to the target favorites folder, simplifying the operation steps of the user to add the first video to the favorites folder, thereby improving the user experience.

Figure 1:
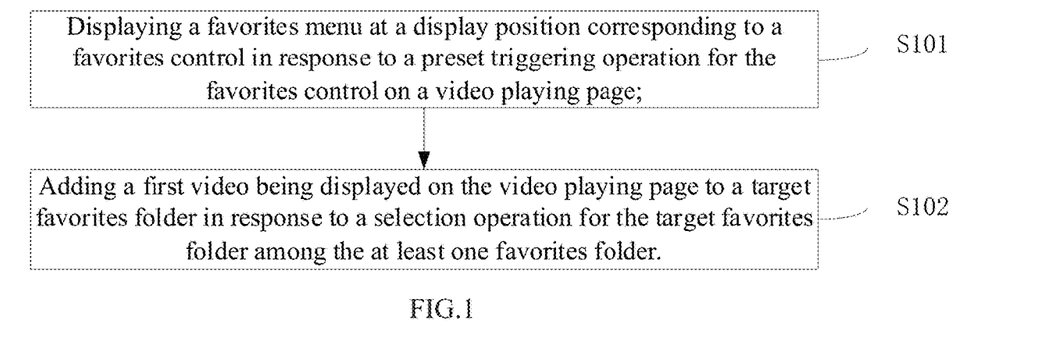
FIG. 1 is a flowchart of a video processing method provided by at least an embodiment of the present disclosure.

On such basis, the embodiments of the present disclosure provide a video processing method, FIG. 1 is a flowchart of a video processing method provided by at least an embodiment of the present disclosure, and the method includes the following steps.

S101: displaying a favorites menu at a display position corresponding to a favorites control in response to a preset triggering operation for the favorites control on a video playing page.

The video processing method provided by the embodiments of the present disclosure can be applied to clients, for example, the clients may include a client deployed in a smartphone, a client deployed in a tablet computer, and the like.

In the embodiments of the present disclosure, the favorites menu is displayed at the display position corresponding to the favorites control in response to the preset triggering operation for the favorites control on the video playing page. For example, the preset triggering operation acting on the favorites control on the video playing page may include a click operation, a long press operation and the like triggered for the favorites control on the video playing page.

In the embodiments of the present disclosure, the favorites menu includes at least one favorites folder created by a current user, and the favorites menu is displayed at the display position corresponding to the favorites control, for example, the favorites menu may be displayed in a preset left region corresponding to the favorites control on the video playing page.

In an optional embodiment, when the preset triggering operation acting on the favorites control of the video playing page is received, the favorites menu is displayed in a form of a bubble, specifically, the favorites menu can be displayed by using a bubble pop-up window, thereby effectively reducing the occlusion of the favorites menu on the video playing page and improving the viewing experience of a video playing user.

Figure 2:
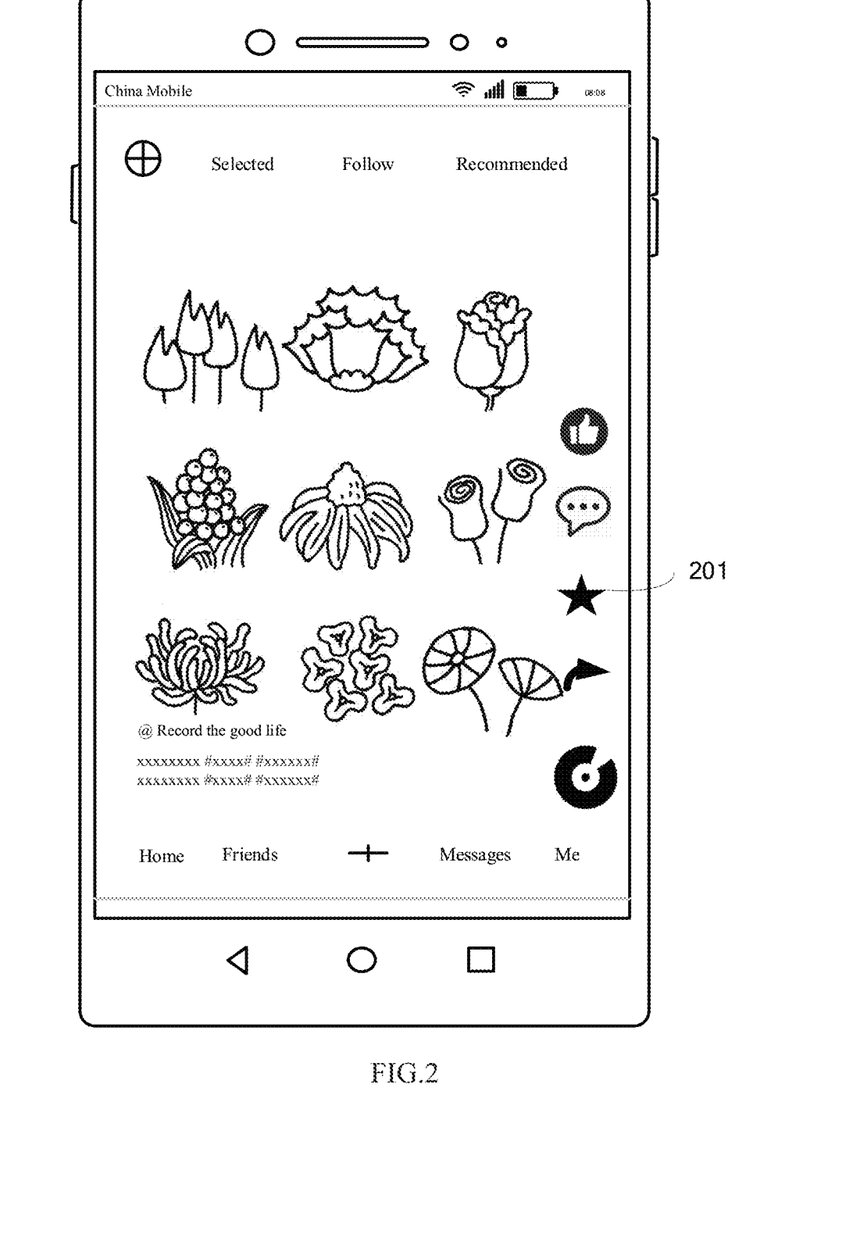
FIG. 2 is a schematic diagram of a video playing page provided by at least an embodiment of the present disclosure.
Figure 3:
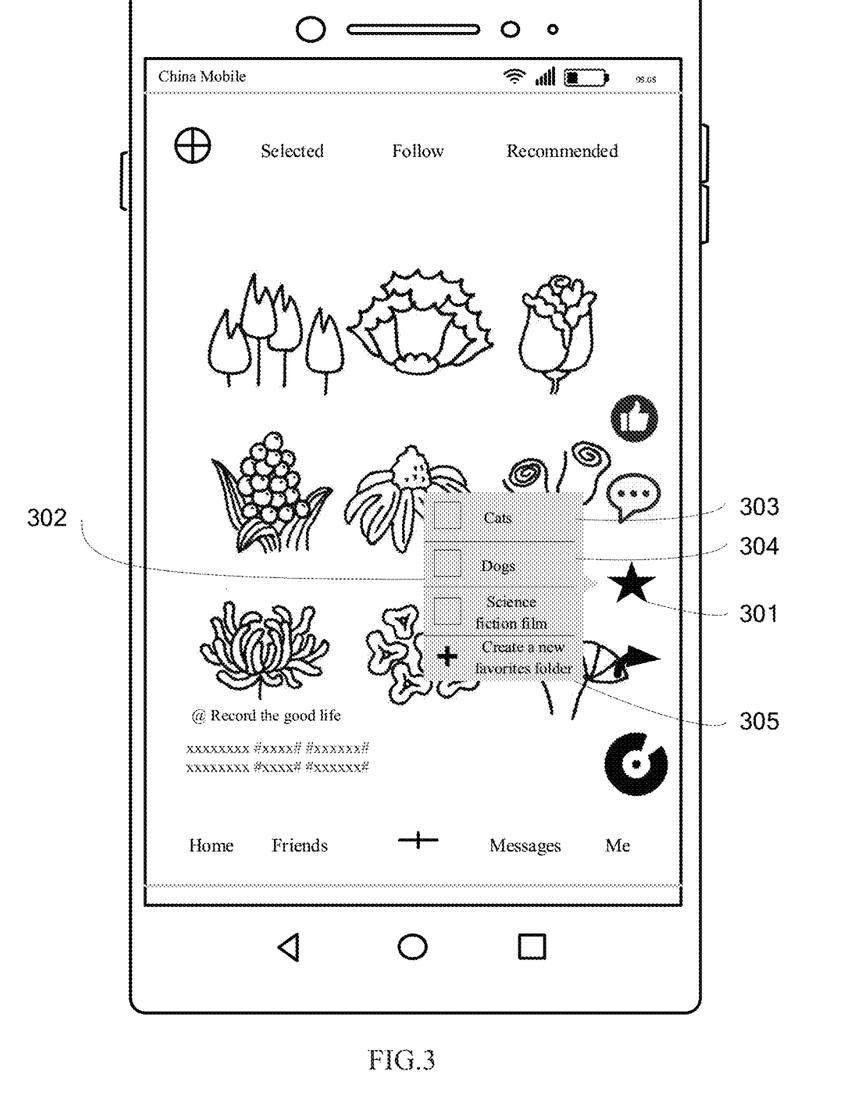
FIG. 3 is a schematic diagram of another video playing page provided by at least an embodiment of the present disclosure.

As shown in FIG. 2, which is a schematic diagram of a video playing page provided by at least an embodiment of the present disclosure, a favorites control 201 is displayed in a right region of the video playing page. When a preset triggering operation of a current user A for the favorites control 201 on the video playing page is received, a favorites menu 302 is displayed in a form of a bubble in a preset left region of a favorites control 301 on the video playing page as shown in FIG. 3. FIG. 3 is a schematic diagram of another video playing page provided by at least an embodiment of the present disclosure, and the favorites menu 302 includes a "Cats" favorites folder 303, a "Dogs" favorites folder 304, etc. created by the user A.

S102: adding a first video being displayed on the video playing page to a target favorites folder in response to a selection operation for the target favorites folder among the at least one favorites folder.

In the embodiments of the present disclosure, the first video may be any one video being displayed on the video playing page; the target favorites folder refers to any one favorites folder in the favorites menu on the video playing page; and the selection operation for the target favorites folder among at least one favorites folder is configured to achieve an effect of adding the first video being displayed on the video playing page to the target favorites folder, for example, the selection operation for the target favorites folder may include a click operation for the target favorites folder, etc.

In the embodiments of the present disclosure, the first video being displayed on the video playing page is added to the target favorites folder in response to the selection operation for the target favorites folder among the at least one favorites folder. For example, as shown in FIG. 3, when a click operation acting on a target favorites folder named "Cats" is received, the first video being displayed on the video playing page is added to the "Cats" favorites folder.

In an optional embodiment, the preset triggering operation for the favorites control on the video playing page may further include a long press operation for the favorites control, and in response to the long press operation for the favorites control, the favorites menu is displayed at the display position corresponding to the favorites control.

Accordingly, after the favorites menu is displayed on the video playing page, the selection operation for the target favorites folder among at least one favorites folder may further include an operation of sliding to the target favorites folder based on the long press operation, and the first video being displayed on the video playing page is added to the target favorites folder in response to the operation of sliding to the target favorites folder.

For example, a first video is displayed on the video playing page shown in FIG. 2, a favorites control 201 is displayed in the right region of the video playing page, a preset guide prompt "Long press to add the current video to a favorites folder" may be displayed on the left side of the favorites control 201, and when a long press operation acting on the favorites control 201 by the current user A is received, as shown in FIG. 3, a favorites menu 302 is displayed in the preset left region of the favorites control 301 in a form of a bubble. Assuming that the current user A wants to add the first video displayed on the video playing page to the favorites folder 303, an effect of adding the first video being displayed to the favorites folder 303 can be achieved by an operation of sliding the long press operation acting on the favorites control 301 to a position where the favorites folder 303 is located and lifting.

In an optional embodiment, after the first video being displayed on the video playing page is added to the target favorites folder "Cats", prompt information "Favorite Successfully!" can be displayed at a preset position of the video playing page, and the favorites menu is hidden.

In the video processing method provided by the embodiments of the present disclosure, first, a favorites menu is displayed at a display position corresponding to a favorites control in response to a preset triggering operation for the favorites control on a video playing page, and the favorites menu includes at least one favorites folder created by the current user; then, a first video being displayed on the video playing page is added to a target favorites folder in response to a selection operation for the target favorites folder among the at least one favorites folder. The embodiments of the present disclosure can more quickly achieve the function of adding the first video to the target favorites folder, simplifying the operation steps of the user to add the first video to the favorites folder, thereby improving the user experience.

Figure 4:
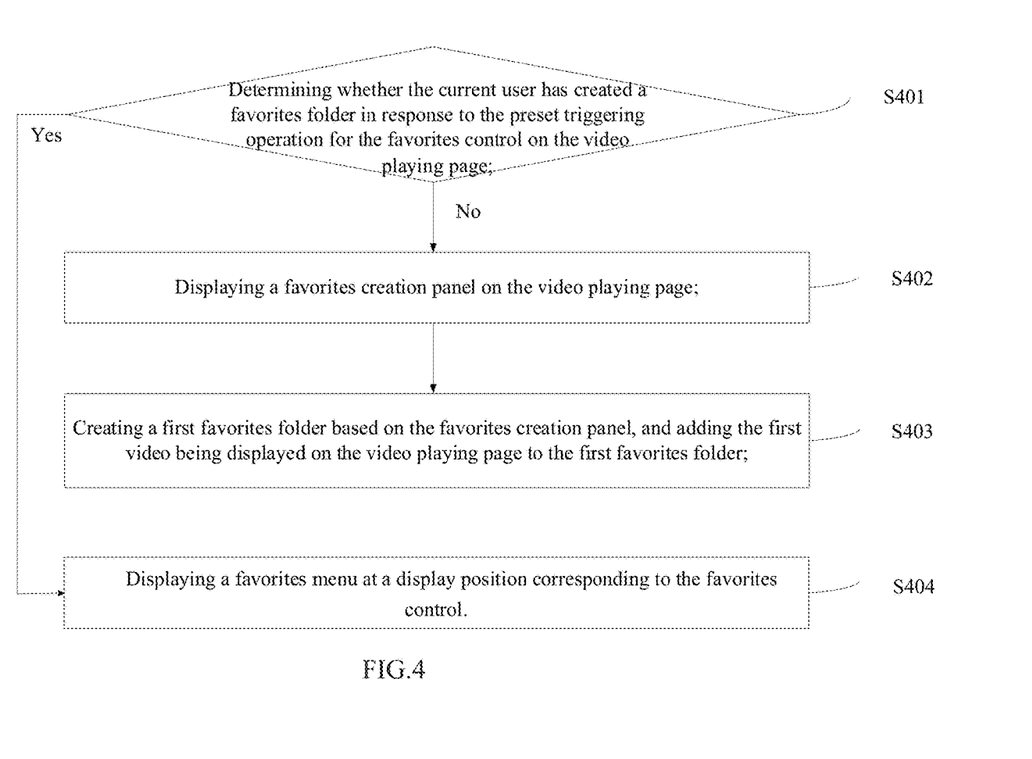
FIG. 4 is a flowchart of another video processing method provided by at least an embodiment of the present disclosure.

Based on the above-mentioned method embodiments, in order to further improve the user experience, the embodiments of the present disclosure further provide a video processing method, FIG. 4 is a flowchart of another video processing method provided by at least an embodiment of the present disclosure, and the method includes the following steps.

S401: determining whether the current user has created a favorites folder in response to the preset triggering operation for the favorites control on the video playing page, if not, performing S402; if so, performing S404.

In the embodiments of the present disclosure, the preset triggering operation for the favorites control on the video playing page may include a click operation and a long press operation triggered for the favorites control.

In the embodiments of the present disclosure, when the preset triggering operation of the current user for the favorites control on the video playing page is received, first, it is determined whether the user has created a favorites folder.

S402: displaying a favorites creation panel on the video playing page.

In the embodiments of the present disclosure, when the preset triggering operation of the current user for the favorites control on the video playing page is received, a favorites creation panel is displayed on the video playing page if it is determined that the current user has not created a favorites folder, so that the user can create a favorites folder on the favorites creation panel. The embodiments of the present disclosure do not limit the display style and the display position of the favorites creation panel.

In an optional embodiment, a preset guide prompt "No favorites folder created yet" may further be displayed above the position of the favorites creation panel, which is used to prompt the current user to create the favorites folder based on the favorites creation panel.

S403: creating a first favorites folder based on the favorites creation panel, and adding the first video being displayed on the video playing page to the first favorites folder.

In the embodiments of the present disclosure, the first favorites folder is a favorites folder firstly created by the current user on the favorites creation panel of the video playing page.

In the embodiments of the present disclosure, in response to a preset triggering operation for a favorites control on a video playing page, a favorites creation panel is displayed on the video playing page if it is determined that the user has not created a favorites folder; then a first favorites folder is created based on the favorites creation panel, and the first video being displayed on the video playing page is added to the first favorites folder.

Figure 5:
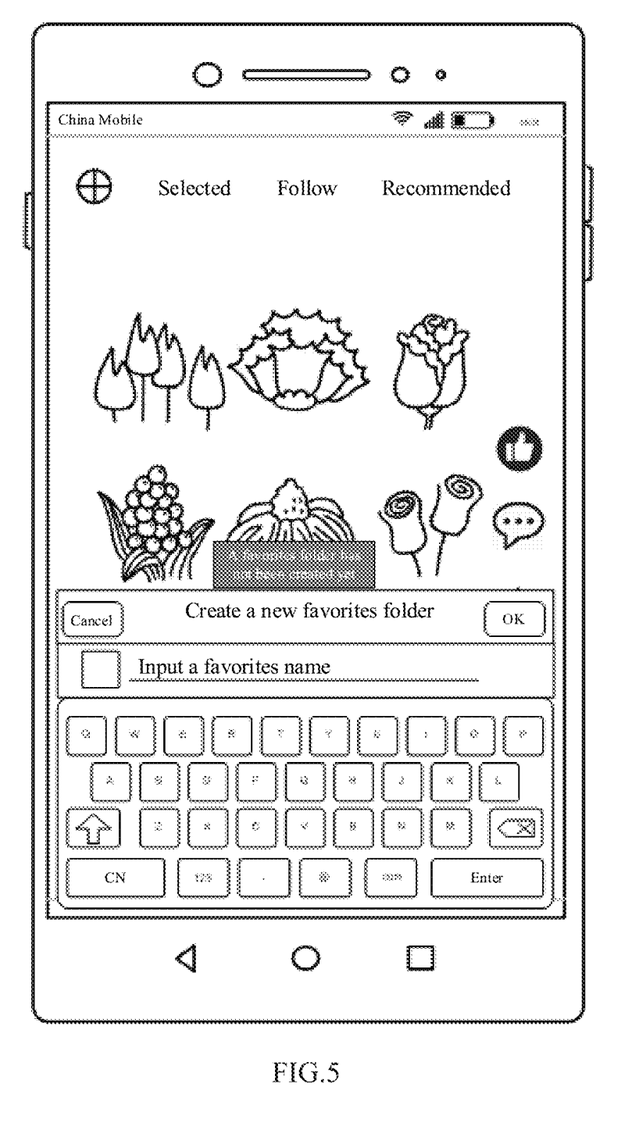
FIG. 5 is a schematic diagram of a favorites creation panel on a video playing page provided by at least an embodiment of the present disclosure.

FIG. 5 is a schematic diagram of a favorites creation panel on a video playing page provided by at least an embodiment of the present disclosure. When a preset triggering operation acting on the favorites control 201 of FIG. 2 is received, the favorites creation panel shown in FIG. 5 is displayed on the video playing page if it is determined that the current user has not created a favorites folder; and after the user inputs "plants" in an input box of the favorites creation panel, the user clicks an OK button to trigger a creation operation for the first favorites folder "plants" and adds the first video being displayed on the video playing page to the first favorites folder "plants".

S404: displaying a favorites menu at a display position corresponding to the favorites control.

In the embodiments of the present disclosure, in response to the preset triggering operation for the favorites control on the video playing page, the favorites menu is displayed at the display position corresponding to the favorites control if it is determined that the user has created a favorites folder.

In practical application, when the favorites menu is displayed at the display position corresponding to the favorites control, a favorites creation control may be displayed on the displayed favorites menu.

In the embodiments of the present disclosure, a second favorites folder is created in response to a triggering operation of the favorites creation control displayed on the favorites menu, and the first video being displayed on the video playing page is added to the second favorites folder.

In the embodiments of the present disclosure, the triggering operation for the favorites creation control may include a click operation triggered for the favorites creation control, etc.; and the second favorites folder refers to a favorites folder created by the current user through the favorites creation control displayed on the favorites menu, and the name of the second favorites folder is different from any one of favorites folders created on the favorites menu.

In an optional embodiment, as shown in FIG. 3, a favorites creation control 305 is displayed in the favorites menu 302 on the video playing page; after the triggering operation of the user for the favorites creation control 305 is received, the favorites creation panel is displayed on the video playing page, the second favorites folder is created based on the favorites creation panel, and the first video being displayed on the video playing page is added to the second favorites folder.

The video processing method provided by the embodiments of the present disclosure, based on the favorites folder created by the current user, is capable of achieving the display of the favorites menu more quickly. In addition, even if the current user has not created a favorites folder, the first favorites folder can be created quickly based on the favorites creation panel displayed on the video playing page. The video processing method provided by the embodiments of the present disclosure simplifies the operation steps for the user to create the first favorites folder, and further improves the user experience.

Figure 6:
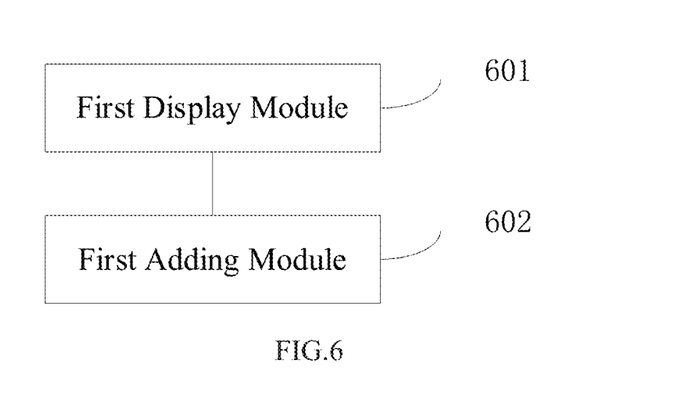
FIG. 6 is a schematic structural diagram of a video processing apparatus provided by at least an embodiment of the present disclosure.

Based on the method embodiments described above, the present disclosure further provides a video processing apparatus. With reference to FIG. 6, which is a structural schematic diagram of a video processing apparatus provided by at least an embodiment of the present disclosure, the apparatus includes a first display module 601 and a first adding module 602.

The first display module 601 is configured to display a favorites menu at a display position corresponding to a favorites control in response to a preset triggering operation for the favorites control on a video playing page, and the favorites menu includes at least one favorites folder created by a current user.

The first adding module 602 is configured to add a first video being displayed on the video playing page to a target favorites folder in response to a selection operation for the target favorites folder among the at least one favorites folder.

In an optional embodiment, the first display module includes a determination submodule and a first display submodule.

The determination submodule is configured to determine whether the current user has created a favorites folder in response to the preset triggering operation for the favorites control on the video playing page.

The first display submodule is configured to display the favorites menu at the display position corresponding to the favorites control if the current user is determined to have created the favorites folder.

In an optional embodiment, the apparatus further includes a display module and a second adding module.

The display module is configured to display a favorites creation panel on the video playing page if the current user is determined not to have created the favorites folder.

The second adding module is configured to create a first favorites folder based on the favorites creation panel, and add the first video being displayed on the video playing page to the first favorites folder.

In an optional embodiment, the first display module further includes a second display submodule.

The second display submodule is configured to display the favorites menu at the display position corresponding to the favorites control in response to a long press operation for the favorites control on the video playing page.

Correspondingly, the first adding module is specifically configured to add the first video being displayed on the video playing page to the target favorites folder in response to an operation of sliding to the target favorites folder among the at least one favorites folder based on the long press operation.

In an optional embodiment, the first display module further includes a third display submodule.

The third display submodule is configured to display the favorites menu in a form of a bubble at the display position corresponding to the favorites control, in response to the preset triggering operation for the favorites control on the video playing page.

In an optional embodiment, the apparatus further includes a third adding module.

The third adding module is configured to create a second favorites folder in response to a triggering operation for the favorites creation control, and add the first video being displayed on the video playing page to the second favorites folder.

In the video processing apparatus provided by the embodiments of the present disclosure, first, a favorites menu is displayed at a display position corresponding to a favorites control in response to a preset triggering operation for the favorites control on a video playing page, and the favorites menu includes at least one favorites folder created by the current user; then, a first video being displayed on the video playing page is added to a target favorites folder in response to a selection operation for the target favorites folder among the at least one favorites folder. The embodiments of the present disclosure can more quickly achieve the function of adding the first video to the target favorites folder, simplifying the operation steps of the user to add the first video to the favorites folder, thereby improving the user experience.

In addition to the methods and apparatuses described above, the embodiments of the present disclosure further provide a computer-readable storage medium, instructions are stored in the computer-readable storage medium, and the instructions, when running on a terminal device, cause the terminal device to implement the video processing method according to the embodiments of the present disclosure.

The embodiments of the present disclosure further provide a computer program product including a computer program/instruction, and the computer program/instruction, when executed by a processor, implements the video processing method according to the embodiments of the present disclosure.

Figure 7:
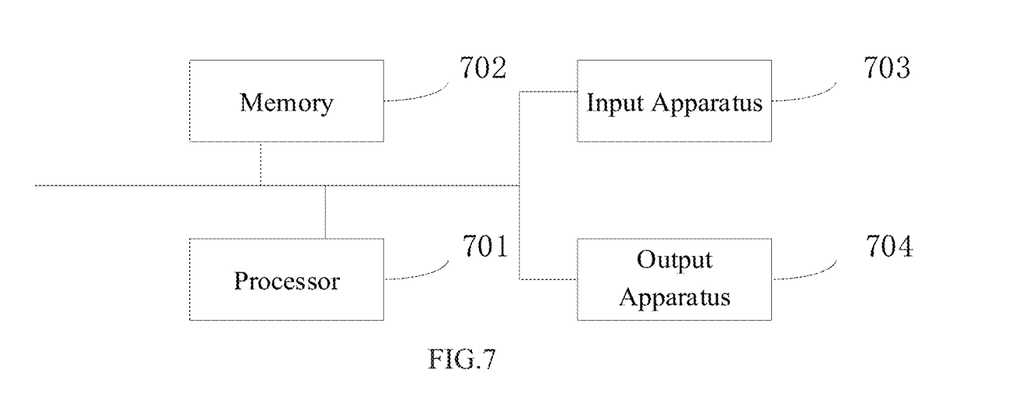
FIG. 7 is a schematic structural diagram of a video processing device provided by at least an embodiment of the present disclosure.

In addition, the embodiments of the present disclosure further provide a video processing device, as shown in FIG. 7, which may include a processor 701, a memory 702, an input apparatus 703, and an output apparatus 704.

The number of the processor 701 in the video processing device may be one or more, and one processor is taken as an example in FIG. 7. In some embodiments of the present disclosure, the processor 701, the memory 702, the input apparatus 703 and the output apparatus 704 may be connected through a bus or other means, and the connection through the bus is taken as an example in FIG. 7.

The memory 702 can be configured to store software programs and modules, and the processor 701 executes various functional applications and data processing of the video processing device by running the software programs and modules stored in the memory 702. The memory 702 may mainly include a program storage area and a data storage area, and the program storage area may store an operating system, at least one application program required for a function, and the like. In addition, the memory 702 may include high-speed random-access memory, and may also include non-volatile memory, such as at least one magnetic disk storage device, flash memory device, or other volatile solid-state storage device. The input apparatus 703 may be configured to receive input numeric or character information, and to generate signal input related to user settings and function control of the video processing device.

Specifically, in the present embodiment, the processor 701 can follow the following instructions to load the executable files corresponding to the processes of one or more application programs into the memory 702, and the processor 701 can run the applications stored in the memory 702 to realize the various functions of the above-described video processing device.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A method of processing videos, comprising:
   displaying a favorites menu at a display position corresponding to a favorites control in response to a preset triggering operation for the favorites control on a video playing page, wherein the favorites menu comprises at least one favorites folder created by a current user, wherein the displaying a favorites menu at a display position corresponding to a favorites control in response to a preset triggering operation for the favorites control on a video playing page comprises:
      determining whether the current user has created a favorites folder in response to the preset triggering operation for the favorites control on the video playing page, and
      displaying the favorites menu at the display position corresponding to the favorites control in response to determining that the current user has created the favorites folder; and
   adding a first video being displayed on the video playing page to a target favorites folder in response to a selection operation for the target favorites folder among the at least one favorites folder.

2. The method according to claim 1, further comprising:
   displaying a favorites creation panel on the video playing page in response to determining that the current user has not created the favorites folder; and
   creating a first favorites folder based on the favorites creation panel, and adding the first video being displayed on the video playing page to the first favorites folder.

3. The method according to claim 1, wherein displaying a favorites menu at a display position corresponding to a favorites control in response to a preset triggering operation for the favorites control on a video playing page, comprises:
   displaying the favorites menu at the display position corresponding to the favorites control in response to a long press operation for the favorites control on the video playing page;
   correspondingly, adding a first video being displayed on the video playing page to a target favorites folder in response to a selection operation for the target favorites folder among the at least one favorites folder, comprises:
   adding the first video being displayed on the video playing page to the target favorites folder in response to an operation of sliding to the target favorites folder among the at least one favorites folder based on the long press operation.

4. The method according to claim 1, wherein displaying a favorites menu at a display position corresponding to a favorites control in response to a preset triggering operation for the favorites control on a video playing page, comprises:
   displaying the favorites menu in a form of a bubble at the display position corresponding to the favorites control, in response to the preset triggering operation for the favorites control on the video playing page.

5. The method according to claim 1, wherein a favorites creation control is displayed on the favorites menu, and after displaying a favorites menu at a display position corresponding to a favorites control in response to a preset triggering operation for the favorites control on a video playing page, the method further comprises:
   creating a second favorites folder in response to a triggering operation for the favorites creation control, and adding the first video being displayed on the video playing page to the second favorites folder.

6. The method according to claim 1, wherein a favorites creation control is displayed on the favorites menu, and after displaying a favorites menu at a display position corresponding to a favorites control in response to a preset triggering operation for the favorites control on a video playing page, the method further comprises:
   creating a second favorites folder in response to a triggering operation for the favorites creation control, and adding the first video being displayed on the video playing page to the second favorites folder.

7. The method according to claim 2, wherein a favorites creation control is displayed on the favorites menu, and after displaying a favorites menu at a display position corresponding to a favorites control in response to a preset triggering operation for the favorites control on a video playing page, the method further comprises:
    creating a second favorites folder in response to a triggering operation for the favorites creation control, and adding the first video being displayed on the video playing page to the second favorites folder.

8. The method according to claim 3, wherein a favorites creation control is displayed on the favorites menu, and after displaying a favorites menu at a display position corresponding to a favorites control in response to a preset triggering operation for the favorites control on a video playing page, the method further comprises:
    creating a second favorites folder in response to a triggering operation for the favorites creation control, and adding the first video being displayed on the video playing page to the second favorites folder.

9. The method according to claim 4, wherein a favorites creation control is displayed on the favorites menu, and after displaying a favorites menu at a display position corresponding to a favorites control in response to a preset triggering operation for the favorites control on a video playing page, the method further comprises:
    creating a second favorites folder in response to a triggering operation for the favorites creation control, and adding the first video being displayed on the video playing page to the second favorites folder.

10. A non-transitory computer-readable storage medium, storing instructions, wherein the instructions, when executed by a terminal device, cause the terminal device to implement operations comprising:
    displaying a favorites menu at a display position corresponding to a favorites control in response to a preset triggering operation for the favorites control on a video playing page, wherein the favorites menu comprises at least one favorites folder created by a current user, wherein the displaying a favorites menu at a display position corresponding to a favorites control in response to a preset triggering operation for the favorites control on a video playing page comprises:
        determining whether the current user has created a favorites folder in response to the preset triggering operation for the favorites control on the video playing page, and
        displaying the favorites menu at the display position corresponding to the favorites control in response to determining that the current user has created the favorites folder; and
    adding a first video being displayed on the video playing page to a target favorites folder in response to a selection operation for the target favorites folder among the at least one favorites folder.

11. A device of processing videos, comprising a memory, a processor, and a computer program stored on the memory and executable by the processor, wherein the computer program, when executed by the processor, causes the processor to implement operations comprising:
    displaying a favorites menu at a display position corresponding to a favorites control in response to a preset triggering operation for the favorites control on a video playing page, wherein the favorites menu comprises at least one favorites folder created by a current user, wherein the displaying a favorites menu at a display position corresponding to a favorites control in response to a preset triggering operation for the favorites control on a video playing page comprises:
        determining whether the current user has created a favorites folder in response to the preset triggering operation for the favorites control on the video playing page, and
        displaying the favorites menu at the display position corresponding to the favorites control in response to determining that the current user has created the favorites folder; and
    adding a first video being displayed on the video playing page to a target favorites folder in response to a selection operation for the target favorites folder among the at least one favorites folder.

12. The non-transitory computer-readable storage medium according to claim 10, the operations further comprising:
    displaying a favorites creation panel on the video playing page in response to determining that the current user has not created the favorites folder; and
    creating a first favorites folder based on the favorites creation panel, and adding the first video being displayed on the video playing page to the first favorites folder.

13. The non-transitory computer-readable storage medium according to claim 10, the operations further comprising:
    displaying the favorites menu at the display position corresponding to the favorites control in response to a long press operation for the favorites control on the video playing page; and
    adding the first video being displayed on the video playing page to the target favorites folder in response to an operation of sliding to the target favorites folder among the at least one favorites folder based on the long press operation.

14. The non-transitory computer-readable storage medium according to claim 10, the operations further comprising:
    displaying the favorites menu in a form of a bubble at the display position corresponding to the favorites control in response to the preset triggering operation for the favorites control on the video playing page.

15. The non-transitory computer-readable storage medium according to claim 10, the operations further comprising:
    creating a second favorites folder in response to a triggering operation for the favorites creation control; and
    adding the first video being displayed on the video playing page to the second favorites folder.

16. The device according to claim 11, the operations further comprising:
    displaying a favorites creation panel on the video playing page in response to determining that the current user has not created the favorites folder; and
    creating a first favorites folder based on the favorites creation panel, and adding the first video being displayed on the video playing page to the first favorites folder.

17. The device according to claim 11, the operations further comprising:
    displaying the favorites menu at the display position corresponding to the favorites control in response to a long press operation for the favorites control on the video playing page; and
    adding the first video being displayed on the video playing page to the target favorites folder in response to an operation of sliding to the target favorites folder among the at least one favorites folder based on the long press operation.

18. The device according to claim 11, the operations further comprising:
   displaying the favorites menu in a form of a bubble at the display position corresponding to the favorites control in response to the preset triggering operation for the favorites control on the video playing page.

19. The device according to claim 11, the operations further comprising:
   creating a second favorites folder in response to a triggering operation for the favorites creation control; and
   adding the first video being displayed on the video playing page to the second favorites folder.

\* \* \* \* \*